United States Patent Office 3,160,172
Patented Dec. 8, 1964

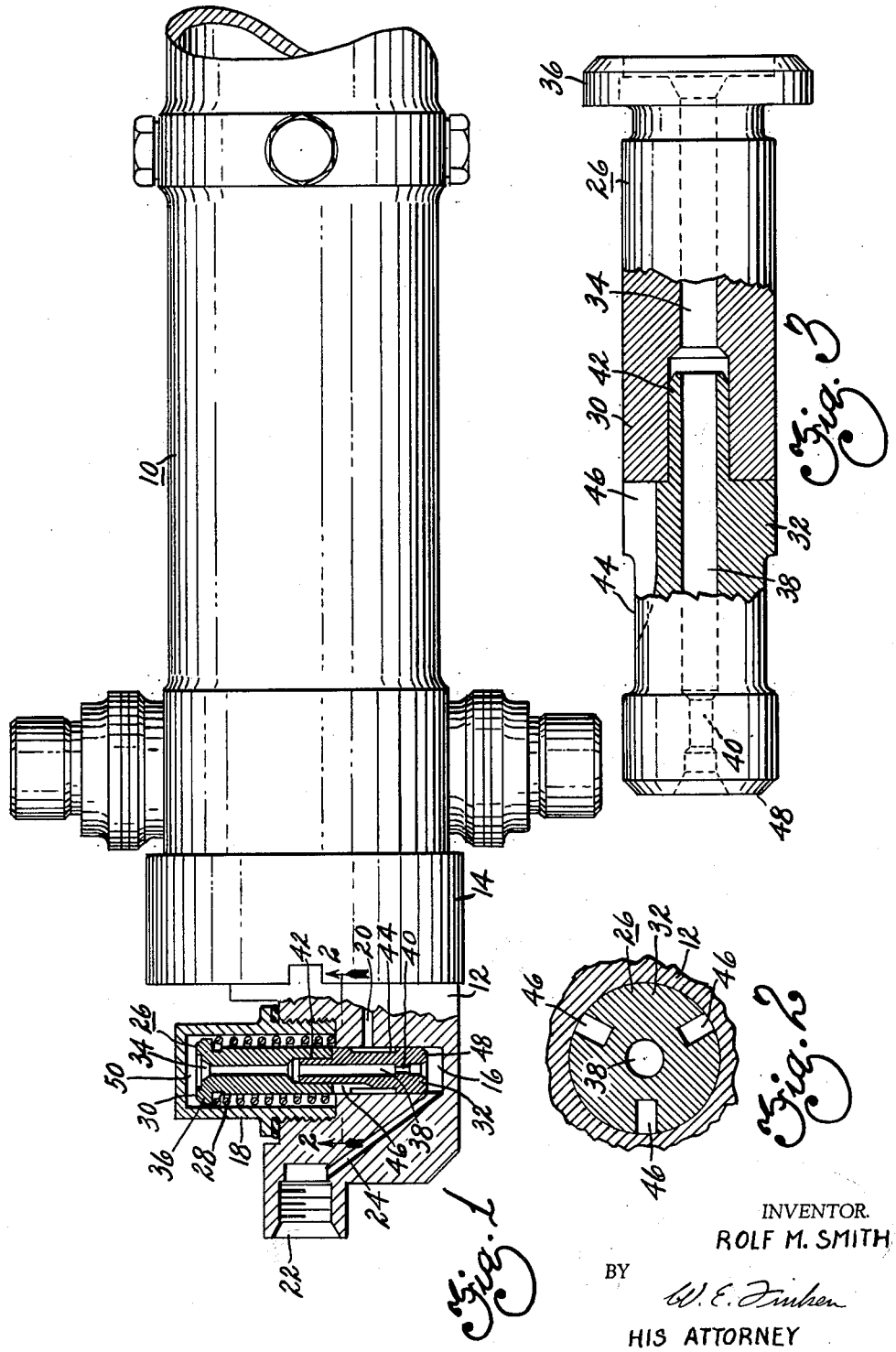

3,160,172
FLOW REGULATING VALVE FOR ACTUATORS
Rolf M. Smith, Indianapolis, Ind., assignor to General Motors Corporation, Detroit, Mich., a corporation of Delaware
Filed May 27, 1963, Ser. No. 283,308
4 Claims. (Cl. 137—504)

This invention pertains to constant flow valves and particularly to an improved flow regulating valve for high temperature hydraulic actuators which maintains a substantially constant circulating cooling flow under substantially constant pressure conditions.

A high temperature hydraulic actuator assembly embodying constant flow valves for controlling the continuous flow of cooling fluid therethrough is disclosed in Geyer Patent 3,000,357. However, the flow valve construction in the actuator of the aforementioned patent does not provide means for continuous flow of fluid to the spring chamber, and in use this has resulted in coking and sticking of the valves due to the high ambient temperatures to which the actuators are subjected. The present invention relates to an improved substantially constant flow valve wherein the fluid is continuously circulated through the spring chamber at all times to prevent coking and sticking of the valve.

Accordingly, among my objects are the provision of an improved flow regulating valve assembly embodying means for obtaining a constant flow through the valve and precluding trapping of fluid therein; the further provision of a constant regulating valve assembly embodying a pressure responsive spring biased piston wherein fluid is continuously circulated through the spring valve chamber so as to prevent coking of the fluid therein; and the still further provision of an improved cooling flow regulating valve designed for use with high temperature hydraulic actuators through which oil is continuously circulated at a rate determined by the pressure head.

The aforementioned and other objects are accomplished in the present invention by designing the valve piston so as to prevent the trapping of fluid in the spring chamber of the valve assembly. To this end the valve piston comprises two parts which, after machining, are brazed together, the piston having a metering orifice and slotted side walls that connect with a central bore, and wherein the only flow path is through the slots, the spring chamber and the central bore to the metering orifice so as to assure continuous flow through the spring chamber and thus preclude trapping of fluid therein.

Further objects and advantages of the present invention will be apparent from the following description, reference being had to the accompanying drawing, wherein a preferred embodiment of the present invention is clearly shown.

In the drawing:
FIGURE 1 is a fragmentary view, partly in section and partly in elevation, of an actuator embodying the improved flow regulating valve of the present invention.
FIGURE 2 is a view taken along line 2—2 of FIGURE 1.
FIGURE 3 is an enlarged view, partly in section and partly in elevation, of the improved piston assembly of the flow regulating valve.

As shown in FIGURE 1, the actuator comprises a cylinder 10 having a head cap 12 attached thereto by a nut 14. The cylinder 10 also includes a tail cap, not shown. The actuator construction, per se, is of the type disclosed in the aforementioned Patent 3,000,357 and hence is neither shown nor described herein. Suffice it to say that both the head cap 12 and the tail cap, not shown, embody constant flow valve assemblies which maintain a substantially constant circulating flow of hydraulic fluid from their respective pressurized chambers.

To achieve this circulating flow, the head cap 12, which constitutes the valve body, is formed with a valve bore 16 having an enlarged threaded portion which receives a valve cap 18. The head cap 12 is formed with a passage 20 that communicates with the bore 16 at one end, and with one of the actuator chambers, not shown, at the other end. In addition, the bore 16 is connected with a drain port 22 through passage 24.

The constant flow valve comprises a piston assembly 26 disposed within the bore 16 and biased upwardly, as seen in FIGURE 1, by a coil spring 28. Referring particularly to FIGURE 3, the piston assembly 26 is made in two parts 30 and 32 which are subsequently united by brazing. The part 30 is formed with a stepped through bore 34 having a shoulder 36 at one end constituting a seat for the coil spring 28. The part 32 is formed with a central bore 38 that connects with a metering orifice 40 at the end thereof. The part 32 is formed with a tubular extension 42 adapted to be telescopically received in the enlarged portion of the through bore 34 in the part 30. In addition, the part 32 is formed with an annular groove, or undercut portion, 44 and three axially extending, equiangularly spaced slots, or grooves, 46 which intersect the undercut 44.

By making the piston assembly in two parts 30 and 32, these parts can be individually machined and held to close tolerances so as to obtain sharp corners at the junction of the peripheral slots 46 of the part 32 and the part 30. This has been found to reduce the possibility of dirt collection and enables accurate pressure regulation. After machining the two parts are assembled with the tubular portion 42 of the part 32 fitted into the enlarged portion of the bore 34 of the part 30, and thereafter the parts 30 and 32 are brazed together to form a unitary piston assembly. The piston assembly 26 is then inserted in the valve bore 16 of the head cap 12 with the undercut 44 adjacent the passage 20 and the piston head portion 48 of the part 32 on the drain side of the passage 20. Accordingly, pressurized fluid from the actuator chamber flowing through passage 20, annular groove 44, slots 46 to the spring chamber 50 will act on the piston assembly 26 in opposition to the spring 28. The pressure head in spring chamber 50 is regulated by coaction between the ends of the slots 46 and the upper edge of the valve body 12 through which fluid flow from the actuator chamber is throttled. Thus, fluid will flow from the passage 20 through the undercut 44 and the slots 46 through the spring chamber 50, and thence through the bores 34 and 38 to the metering orifice 40 and the valve bore, or chamber, 16 and thence through passage 24 to the drain port 22. In this manner the fluid will be continuously circulated through the spring chamber 50 at a predetermined rate determined by the pressure head in the spring chamber to eliminate trapping of fluid in the spring chamber such as occurs with the constant flow valve assembly disclosed in the aforementioned Patent 3,000,357.

While the embodiment of the invention as herein disclosed constitutes a preferred form, it is to be understood that other forms might be adopted.

What is claimed is as follows:
1. A flow regulating valve assembly comprising, a valve body having a valve bore therein with a pressure inlet port and a drain port communicating with said valve bore, a valve cap attached to said valve body and providing a spring chamber, a piston reciprocably supported in said valve bore, and a spring biasing said piston in one direction, said piston having a surface exposed to the spring chamber which, when subjected to pressure moves said piston in a direction opposite to said spring, said piston having an undercut communicating at all times with said pressure inlet port, slot means interconnecting said undercut and said spring chamber and a piston through bore connecting said spring chamber with a metering orifice in said piston whereby fluid will flow at a rate determined by the pressure head in the spring chamber through the pressure inlet port, said slot means, said spring chamber, said through bore and the metering orifice to the drain port.

2. A pressure responsive flow regulating valve assembly comprising, a valve body having a valve bore therein connected with a pressure inlet port and a drain port, a valve cap attached to said body and forming a spring chamber, a reciprocable piston disposed in said valve bore having a portion extending into said spring chamber, and spring means disposed in said spring chamber and acting constantly on said piston for biasing the piston in one direction, said piston having a surface exposed at all times to the spring chamber for biasing the piston in the opposite direction, said piston having a central through bore connected with a metering orifice and slot means in the side wall of said piston interconnecting said valve bore and said spring chamber to provide continuous circulation of fluid through the spring chamber, the piston through bore and the metering orifice to the drain port in accordance with the pressure head in said spring chamber.

3. A flow regulating valve assembly comprising, a valve body having a valve bore with a pressure inlet port and a drain port communicating therewith, a valve cap secured to said valve body having a spring chamber therein, a piston reciprocably supported in said valve bore and having a portion extending into said spring chamber, and a spring disposed in said spring chamber and acting constantly on said piston for biasing said piston in one direction, said piston having an undercut connected at all times to said pressure inlet port and a pressure responsive surface exposed to the pressure in said spring chamber for biasing the piston in the opposite direction, said piston having a through bore connected with a metering orifice and peripheral slot means interconnecting said undercut and said spring chamber to provide continuous circulation of fluid from said pressure inlet port through said spring chamber and piston through bore to the metering orifice due to the pressure head in said spring chamber.

4. The valve assembly set forth in claim 3 wherein said piston comprises two parts which are rigidly united, and wherein said slot means are formed in one of said parts and comprise three equiangularly spaced peripheral slots which intersect said undercut.

References Cited in the file of this patent

UNITED STATES PATENTS

| | | |
|---|---|---|
| 1,900,514 | McLean | Mar. 7, 1933 |
| 2,224,216 | Coberly | Dec. 10, 1940 |